United States Patent [19]
Schultheis et al.

[11] Patent Number: 4,824,302
[45] Date of Patent: Apr. 25, 1989

[54] EXTENSIBLE TWIST TO LOCK LOAD OR CARGO BRACING DEVICE

[76] Inventors: Kevin A. Schultheis, Dulzura; Delmer Trimble, Santee, both of Calif.

[21] Appl. No.: 165,231

[22] Filed: Mar. 7, 1988

[51] Int. Cl.$^4$ ............................................. B60P 7/06
[52] U.S. Cl. ................................ 410/151; 211/105.3; 403/350
[58] Field of Search ................ 410/121, 140, 143–146, 410/151; 211/105.3, 123; 403/104, 350, 351; 248/362, 363, 205.5

[56] References Cited

U.S. PATENT DOCUMENTS

| | | | |
|---|---|---|---|
| 549,768 | 11/1895 | Day | 211/105.3 |
| 1,951,660 | 3/1934 | Klaudt | 410/145 X |
| 2,812,614 | 4/1955 | Ladyman | 248/362 |
| 2,974,931 | 3/1961 | Reel et al. | 410/151 X |
| 3,655,193 | 4/1972 | Jones | 248/363 X |
| 3,952,877 | 4/1976 | Kindl | 211/123 X |
| 4,076,437 | 2/1978 | Mazzolla | 403/350 |
| 4,332,515 | 6/1982 | Twyman | 410/151 X |

FOREIGN PATENT DOCUMENTS 433625  9/1967  Switzerland .................. 410/151

*Primary Examiner*—Robert B. Reeves
*Assistant Examiner*—Dean J. Kramer
*Attorney, Agent, or Firm*—Frank D. Gilliam

[57] ABSTRACT

The device comprises a pair of poles of tubular configured material such as aluminum, thin wall steel, plastic or the like which have a close telescoping engagement. Positioned at the distal ends of each pole is a suction cup constructed of pliable material such as rubber, plastic or the like. On the inside end of the inner telescoping pole is positioned a disk of plastic or the like material. The disk is rotatably attached to the end of the inside pole by a screw or the like. The attachment of the disk is off center whereby when the disk is rotated relative to the outer pole at least a portion of its outer periphery contacts the inner wall of the outer pole. The flexibility of the suction cup at its attachment to the pole allows the pole to be extended between two adjacent surfaces which are not necessarily parallel. In operation the poles are telescoped apart until the suction cups are pressed substantially flat against the adjacent surfaces and then the poles are turned relative to each other causing the disk to rotate against the inner surface of the outside pole of the telescopically nested poles causing the outer surface of the disk to bind against the inner surface of the outside pole locking the poles in their selected extended positions.

5 Claims, 1 Drawing Sheet

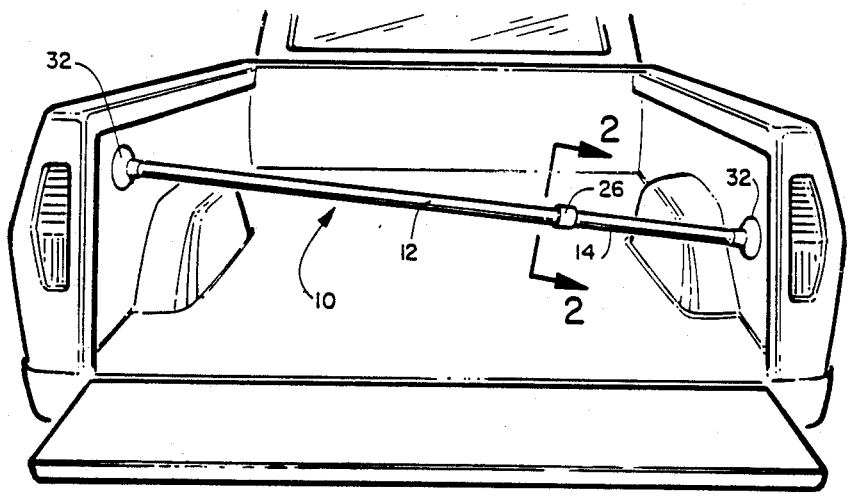
FIGURE 1
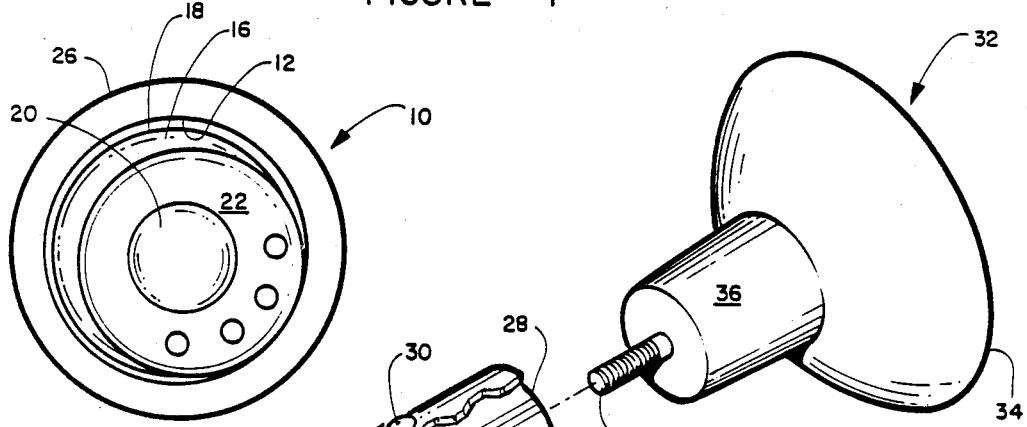
FIGURE 2
FIGURE 3
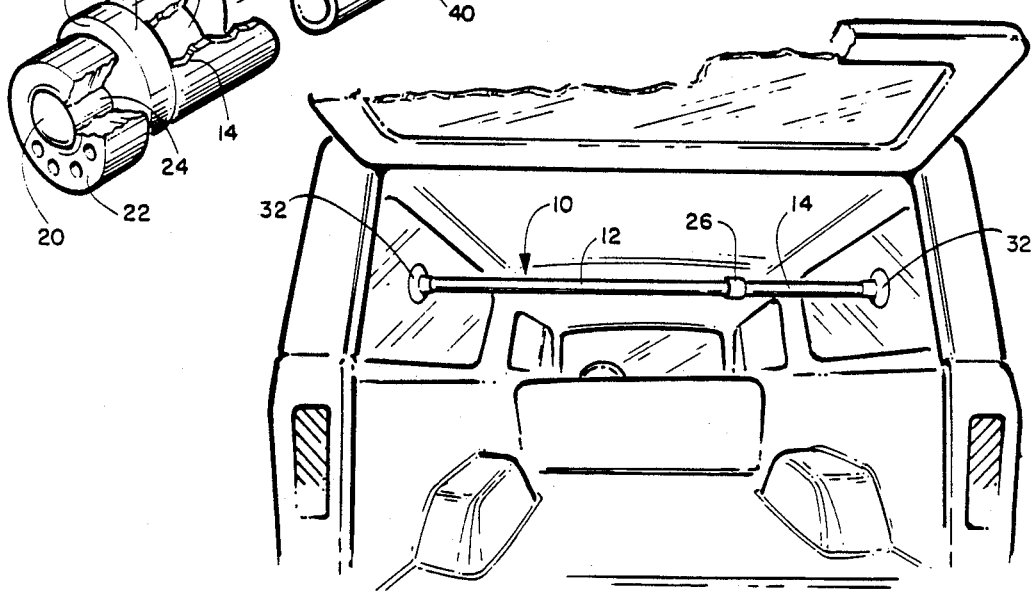
FIGURE 4

EXTENSIBLE TWIST TO LOCK LOAD OR CARGO BRACING DEVICE

BACKGROUND OF THE INVENTION

1. Field of the Invention

This invention relates to cargo loading and transport apparatus which may be selectively installed in transport vehicles, passenger vehicles and the like.

2. Description of the Prior Art

A major problem involved in the transport of cargo on the bed of a pickup, van or the like is the provision of suitable dunnage, bracing equipment and fixedly positioned poles to restrain cargo from movement during transit. Conventionally, this is most commonly accomplished by use of ropes or belts which lash the cargo against the sidewalls of the truck bed. The lashing arrangement requires that the cargo be placed directly against a sidewall surface. Thus there is a substantial amount of space within the interior floor area of a truck or van for which a sidewall surface is not available for lashing purposes.

Some equipment or cargo is best transported in a vertical, hanging position. Conventional cross bars have been provided for supporting a hanging load, but require the installation of hooks or slots in fixed locations for supporting the cross bar.

It is sometimes desirable to support cargo at an elevated position above the deck floor, in order to physically separate two different loads. For example, it may be desirable to lay large sheets of material on the deck of a pickup and carry lighter and smaller objects at an elevated position above the floor so that either can be of loaded before the other, etc.

U.S. Pat. Nos. 3,049,328 and 4,343,578 teach devices to overcome this general transport problem.

U.S. Pat. No. 3,049,328 issued to Ray H. Bishop teaches a telescoping device which includes a resilient pad at each end thereof to engage a parallel side surfaces and a ratchet means to extend one end of the device in a telescopic manner to engage and lock each pad against an adjacent parallel surface. The device is held in the extended position by the teeth of the ratchet means. The ratchet maintains the pads forcibly against the adjacent parallel surface. The ratchet mechanism, even though relatively concealed, interferes with cargo positioned thereagainst.

U.S. Pat. No. 4,343,578 issued to Burris P. Barnes teaches a load stabilizer for a pickup truck which includes a pair of telescoping beam members that span the width of the bed of the truck and restrain cargo therein by engaging opposite parallel sidewalls of the truck bed. An external locking means is taught for locking the telescoping members in a selected length position. Like the aforementioned patent, resilient pads are utilized for engaging the parallel truck sidewalls. In this device the locking means also protrudes externally of the telescoping members and interferes with cargo resting thereon or being steadied thereby, if the locking means were rotated to the side or bottom. The pads are free to move relative to the truck bed during bed vibrations as would the pads of the aforementioned patent. In both teachings the force of the extension means is relied upon to hold the pads in position.

SUMMARY OF THE INVENTION

The invention is an advancement of the cargo transporting art providing a telescopic bar or pole that extends a required distance between two adjacent surfaces which are not necessarily parallel. On each distal end of the telescopic pole is located a suction cup which has a long neck attachment means which extends from the hollow end of the tube. The suction cups are attached to plugs which are inserted in the open ends of the tubes by means of screw or the like. This neck extension of the suction cup allows considerable flexibility to movement of the concave cup portion of the suction cup relative to the pole whereby the pole can be placed in a horizontal portion even if the adjacent walls are not on true parallel planes. The locking of the pole in its desired extended length is accomplished by means of a disk rotatably connected off center to the distal end of the inside pole of the telescoping pair. By locating the locking means within the telescoping pole the outside surface of the pole is free of clutter, such as, the length maintaining apparatus and the locking mechanism does not interfere with the braced or supported load. A smooth lubricious sleeve is positioned on the inner distal end of the outer most pole of the telescoping pair to aid in ease of relative translation of the telescoping poles.

In operation the lock is in a released non binding position and the poles are telescoped outwardly between two adjacent surfaces until the suction cups bear against the surfaces in a flattened evacuated, air removed, configuration. The two poles are then rotated slightly in opposing directions until the disk is rotated hard against the inner wall of the outer pole. The disk now holds the poles in the extended position until their latter removal when use is completed. When it is desirable to remove the poles the poles are merely rotated in the opposite direction from the locking rotation and the suction cups are released from the support surfaces in a conventional manner, i.e. pulled away from their attached surface by grasping an outer edge etc.

It is, therefore, an object of this invention to provide an improved load stabilizer pole that is adjustable in length and can be non destructively attached to a pair of opposing surfaces which are not necessarily parallel to one another.

It is another object of this invention to provide an improved load stabilizer pole that can be attached to adjacent window surfaces of a vehicle for supporting a hanging load.

Still another object of this invention is to provide a load stabilizer pole that has an internal locking means and has a smooth outer load supporting or bracing surface.

The novel features which characterize the invention are defined by the appended claims. The foregoing and objects, advantages and features of the invention will hereinafter appear, and for the purposes of illustration of the invention, but not of limitation, and exemplary embodiment of the invention is shown in the appended drawings.

BRIEF DESCRIPTION OF THE DRAWING FIGURES

FIG. 1 is a perspective showing of the telescoping load retaining or supporting pole of the invention in position for use in the bed of a pickup truck;

FIG. 2 is a cutaway showing taken along line 2—2 of FIG. 1;

FIG. 3 is a perspective cutaway showing of the common suction cp end and the lock end of one of the inner telescoping elements of the invention; and FIG. 4 depicts the telescoping pole of the invention extending between frictionally and vacuumly attached between two windows of a vehicle.

DETAILED DESCRIPTION OF THE DRAWING FIGURES

Referring now to the various Figures and specifically to FIGS. 1 through 3, wherein the telescopic load support extendable pole is shown in detail. The telescopic pole 10 of the invention comprises a first tubular member 12 which telescopically mates with an inner tubular member 14. These members 12 and 14 can be circular tubular as shown, rectangular, triangular, or any other cross-sectional shape which is suitable for the purpose intended. The members can be constructed of any suitable material including but not limited to aluminum, steel, plastic, or any other metal or substance suitable for the purpose intended.

On the inner distal end 16 of member 14 has an insert 17 which extends into the open end thereof and is secured therein by means of friction or any other suitable means such adhesive or the like. The insert 17 has an outer lip 18 which has an increased diameter substantially equal to the outer diameter of tubular member 14. An axle member 20 which is an integral portion of the insert and lip is positioned off of the vertical center of the lip 18 and extends outwardly therefrom. Rotatably positioned on the axle member is a disk 22. A disk axle member receiving aperture 24 through disk 22 is similarly positioned off center.

On the outer end of tubular member 12 which receives the end of tubular member 14 is positioned a bushing sleeve member 26 which fits over the end of tubular member 12 and has a distal end opening that is slightly larger in diameter than the inside of the tubular member 12. This bushing sleeve provides a smooth bearing or translating surface for relative movement of the tubular members. The sleeve member 26 is constructed of a lubricious material such as, for example Nylon, Teflon, or similar plastic materials suitable for this purpose.

On the distal ends of the telescoped tubular members is a plug 28 which is inserted therein so that the outer end of the plug is substantially flush with the outer surface of the tubular member, the plug may be held in place by any suitable means. A pop rivet 30 is shown for this purpose. Attached to each plugs 28 is a suction cup 32. The suction cup has a conventional concave outer end surface 34 and an extended neck portion 36 extending therefrom. The neck portion of the suction cup is attached to the plug by any convenient means. The suction cup is shown attached to the plug by a screw 38 which is molded into the neck 36 and engages threads 40 centrally positioned in the plug member. The extended neck member provides for flexibility of mounting of the telescopic members in a use position on nonparallel walls or the like. The suction cup and neck are constructed from soft rubber or plastic material suitable for this purpose.

OPERATION OF THE DEVICE

As shown in FIGS. 1 and 4, the device can be installed between two opposing support walls. These walls need not necessarily be parallel to one another as the pliable neck of the suction cups allow for a substantial angling of the suction cups relative to the pole formed by the two tubular members. In use, the pole length is chosen so that it will span the planed distance and have a sufficient length of tubular member 14 inserted into tubular member 12 to prevent bending of the tubular members at their joinder. The tubular members are extended until the suction cups are hard against the supporting side walls, i.e. the concave portion of the suction cups are substantially flattened against the supporting side walls. The tubular members are then rotated in opposite directions. The rotation causes the disk 22 to rotate to a position where it binds on the inner wall of tubular member 12 holding the tubular members in the telescopically extended position where they remain until the tubular members are again rotated in an opposite direction of relative rotation.

From the foregoing description of a preferred embodiment of the invention, those skilled in the art will appreciate the load stabilizer and support assembly of the present invention represents a substantial improvement over the prior art. Although a preferred embodiment of the invention has been described in detail, it should be understood that various changes and alterations can be made therein without departing from the spirit and scope of the invention as defined by the appended claims.

What is claimed is:

1. A telescoping load stabilizing supporting pole for attachment between adjacent surfaces comprising:
   inner and outer telescoping tubular members, said inner tubular member having a smooth bore therethrough;
   locking means carried by said inner tubular member for locking said tubular member in a selected extended relative position against relative rotation, said locking means locking said tubular members in said extended relative position when said tubular members are rotated in opposite directions until locked against further rotation and releasing said tubular members from a locked together position by relative rotation in an opposite direction to the locking direction of rotation;
   a lubricous bushing sleeve on the end of said outer tubular member for receiving said inner tubular member therethrough for smooth relative telescopic movement therebetween; and
   a suction cup attached to the distal ends of said tubular members, said suction cups having an extended pliable neck between their attachment to said tubular members and the distal end thereof.

2. The invention as defined in claim 1 wherein said adjacent surfaces are non-parallel.

3. The invention as defined in claim 1 wherein said locking means comprises a disk rotatably attached off vertical center to the inner distal end of said inner tubular member whereby opposite relative rotation of said tubular members causes said disk to bind against the inner walls of said outer tubular member thereby maintaining said tubular members in a selected telescoped position and releasing said disk binding when said tubular members are rotated in opposite relative directions.

4. The invention as defined in claim 1 wherein said tubular members are constructed from material selected from a group of materials consisting of metal or plastic.

5. The invention as defined in claim 1 wherein said suction cups are constructed from pliable material.

* * * * *